Figure 1:
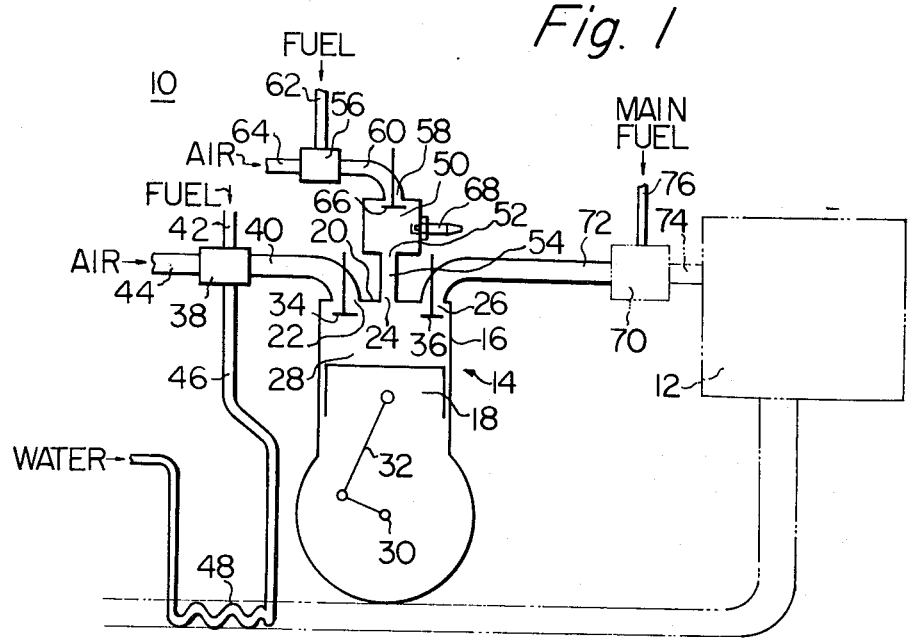

United States Patent [19]

Kosaka et al.

[11] 4,004,554
[45] Jan. 25, 1977

[54] FUEL CONVERTING METHOD AND APPARATUS

[75] Inventors: Katuaki Kosaka, Tokyo; Zene Ueno, Fuchu; Tadahiko Nagaoka, Tokorozawa, all of Japan

[73] Assignee: Nissan Motor Co., Ltd., Yokohama, Japan

[22] Filed: Feb. 20, 1975

[21] Appl. No.: 551,382

[30] Foreign Application Priority Data

Feb. 26, 1974 Japan .................. 49-22677

[52] U.S. Cl. .................. 123/3; 123/DIG. 12; 123/32 SP; 123/25 R
[51] Int. Cl.² .................. F02B 43/08
[58] Field of Search .......... 123/DIG. 9, DIG. 12, 123/1 A, 3, 25 R, 32 SP, 32 ST, 59 EC, 66, 69 R, 119 E, 119 R, 144

[56] References Cited

UNITED STATES PATENTS

| | | | |
|---|---|---|---|
| 3,635,200 | 1/1972 | Rundell et al. | 123/3 |
| 3,672,341 | 6/1972 | Smith et al. | 123/DIG. 12 |
| 3,682,142 | 8/1972 | Newkirk | 123/DIG. 12 |
| 3,717,129 | 2/1973 | Fox | 123/1 A |
| 3,805,752 | 4/1974 | Cataldo | 123/59 EC |
| 3,828,736 | 8/1974 | Koch | 123/3 |
| 3,884,197 | 5/1975 | Miyahi et al. | 123/32 SP X |
| 3,897,225 | 7/1975 | Kodi | 123/3 X |
| 3,908,606 | 9/1975 | Toyoda et al. | 123/3 |

Primary Examiner—Charles J. Myhre
Assistant Examiner—Ira S. Lazarus

[57] ABSTRACT

A free hydrogen containing gas is produced from a fuel by a self-operating or -perpetuating expander in which a working member compresses a base mixture of fuel, oxygen or air and water during the compression stroke thereof. The base mixture is heated, after being compressed, by a flame resulting from combustion of a combustible mixture in a combustion chamber to convert the fuel into the gas, and the gas expands to perform work on the working member which accumulates power for the compression stroke of the working member.

11 Claims, 2 Drawing Figures

FUEL CONVERTING METHOD AND APPARATUS

The present invention relates generally to a method of and a apparatus for producing hydrogen and particularly to a method of converting or cracking a hydrocarbon fuel into a free hydrogen containing gas and an apparatus for accomplishing the same.

It is recognized in the art that if hydrogen is added to a hydrocarbon fuel which is supplied into an internal combustion engine, the engine can use an air-fuel mixture containing more air than is stoichiometrically required for complete combustion. This is because the mixture is activated by hydrogen added thereto. As a result, the engine discharges an exhaust gas which contains considerably low concentrations of harmful components such as hydrocarbons, carbon monoxide and nitrogen oxides.

In the application of such a technique to an engine of an ordinary motor vehicle such as a passenger car, it is dangerous to equip the vehicle with a hydrogen storing container as there is a possibility of explosion. Thus, for safety purposes it is desirable to provide the vehicle with an apparatus which produces hydrogen to be added to a fuel of the engine as required. Thus to produce hydrogen, it is desirable to utilize the so-called "partial oxidation or combustion process" which produces a free hydrogen containing gas from hydrocarbons. According to this process, hydrocarbons are mixed with one third of the oxygen or air stoichiometrically required for complete combustion. The resultant mixture of hydrocarbons and oxygen or air is then partially oxidized under a high pressure, high temperature environment. The hydrocarbons are thus decomposed or converted or cracked into a free hydrogen and carbon monoxide rich gas in the presence of water. The above reaction is exothermic and the free hydrogen containing gas produced has a high temperature.

Accordingly, the following three problems are encountered in executing the partial oxidation process:

1. Power is required for highly compressing the mixture of hydrocarbons and oxygen or air. Thus in a car this results in an increase in the load demand on the engine or power loss of the engine or requires provision for compression.

2. It is necessary to maintain a constant supply of hydrogen to the engine. Thus the fuel converting or cracking reaction must take place at a high rate. Therefore to achieve this rate in the presence of such a lean oxygen supply it is necessary to compress and heat the mixture to a considerably high level. However if adiabatic compression is used, the weight of the apparatus is so great that it is of no practical use.

3. It is necessary to reduce the temperature of the free hydrogen containing gas so that it may be safely fed into an engine. Thus a cooler is necessary.

It is, therefore, an object of the invention to provide a method of and an apparatus for converting or cracking hydrocarbon fuel into a free hydrogen containing gas in which the gas expands to perform work which is accumulated for use in the subsequent operations, and in which the temperature is simultaneously reduced. Thus power and heat losses are reduced, for example, down to zero.

It is a further object of the invention to provide a method and apparatus in which a combustible mixture is ignited to produce a flame which is spouted into a base mixture of hydrocarbons, oxygen or air and water to heat the same to a high temperature necessary to accomplish fuel converting reaction, and so make it unnecessary to adiabatically compress the base mixture.

Figure 2:
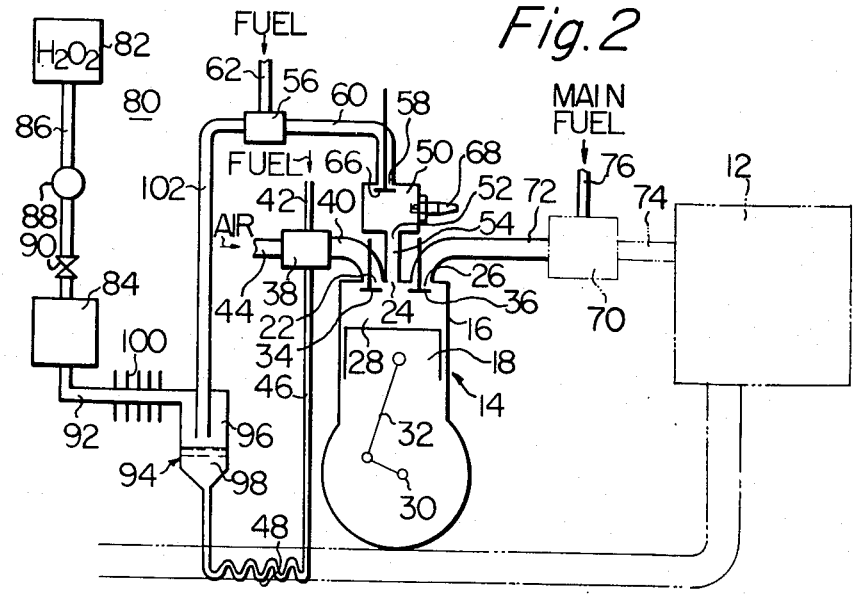

These and other objects and advantages of the invention will become more apparent from the following detailed description taken with reference to the accompanying drawings in which:

FIG. 1 is a schematic view of a first preferred embodiment of a fuel converting or cracking apparatus according to the invention; and FIG. 2 is a schematic view of a second preferred embodiment of a fuel converting or cracking apparatus according to the invention.

Referring to FIG. 1, there is shown a fuel converting or cracking apparatus according to the invention generally designated by the reference numeral 10, and an internal combustion engine 12 of a motor vehicle (not shown). The fuel converting apparatus 10 is shown to comprise a displacement expander 14 of a four-cycle reciprocating piston type. The expander 14 comprises a cylinder 16 and a piston 18 which is axially reciprocally slidably fitted in the cylinder 16. The cylinder 16 has a cylinder head 20 which is formed with an intake port 22, a flame spouting port 24 and an exhaust port 26 therethrough. The piston 18 performs intake, compression, expansion and exhaust strokes in sequence to define a variable volume main or expander chamber 28 in the cylinder 16. The expander chamber 28 serves as a reaction or fuel converting chamber during the expansion stroke of the piston 18. The piston 18 is operatively connected to a crankshaft 30 by means of a connecting rod 32. A flywheel (not shown) is mounted on the crankshaft 30 at one end thereof. The intake and exhaust ports 24 and 26 are provided therein with intake and exhaust valves 34 and 36, respectively. The intake and exhaust valves 34 and 36 are normally closed and are operated by cams (not shown) on a shaft (not shown) driven by the crankshaft 30, so that the intake valve 24 is opened during the intake stroke of the piston 18 and the exhaust valve 26 is opened during the exhaust stroke of the piston 18.

The expander 14 is provided with a main mixing chamber or device 38 which communicates with the intake port 22 by way of a main intake conduit 40. A source (not shown) of hydrocarbon fuel is provided to communicate with the mixing chamber 38 by way of a conduit 42 for supply of fuel thereto. The fuel may be a liquid fuel. A source (not shown) of air is provided to communicate with the mixing chamber 38 by way of a conduit 44 for supply of air thereto. A source of water or water vapour such as a water tank (not shown) is provided to communicate with the mixing chamber 38 by way of a conduit 46 for supply of water or water vapour thereto. The source of air may be the outside atmosphere to which the conduit 44 is vented by way of an air cleaner (not shown). The mixing chamber 38 may be formed therein with a venturi section (not shown) through which air passes to the expander chamber 28 and into which the conduits 42 and 46 open. The flow of air passing through the venturi section during the intake stroke of the piston 18 produces a vacuum in the venturi section to draw or induct fuel and water vapour from the conduits 42 and 46, respectively. Pumps (not shown) may be disposed in the conduits 42, 44 and 46 to inject or spray fuel, air and water under pressure, respectively, therefrom into the mixing chamber 38. In this instance, the venturi section in the mixing chamber 38 may be dispensed with. The fuel, air and water or water vapour supplied into the mixing chamber 38 are mixed with each other to produce a base mixture which is supplied into the expander chamber 28 for compression and conversion thereof into a free hydrogen containing gas. Suitable control means such as a flow control valve (not shown) may be provided in each of the conduits 42, 44 and 46 to meter the flow of fluid passing therethrough in such a manner that the base mixture has a predetermined fuel-air-water ratio. A heat exchanger 48 may be disposed in the conduit 46 so that exhaust gas from the engine 12 heats water supplied to the mixing chamber 38 to produce water vapour. As a result, the thermal efficiency of the engine 12 is increased.

The expander 14 is also provided with an auxiliary or combustion chamber 50 which communicates at an outlet port 52 with the port 24 by way of a conduit 54 and an auxiliary mixing chamber or device 56 which communicates with an inlet port 58 of the combustion chamber 50 by way of an auxiliary intake conduit 60. A source (not shown) of hydrocarbon fuel is provided to communicate with the auxiliary mixing chamber 56 by way of a conduit 62 for supply of fuel thereto. The fuel may be a liquid fuel. A source (not shown) of air is provided to communicate with the auxiliary mixing chamber 56 by way of a conduit 64 for supply of air thereto. The source of air may also be the outside atmosphere to which the conduit 64 is vented by way of an air cleaner (not shown). The auxiliary mixing chamber 56 may be formed therein with a venturi section (not shown) through which air passes to the combustion chamber 50 and into which the conduit 62 opens. The flow of air passing through the venturi section during the intake stroke of the piston 18 produces a vacuum in the venturi section to draw or induct fuel from the conduit 62 thereinto. Alternatively pumps (not shown) may be disposed in the conduits 62 and 64 to inject fuel and air under pressure, respectively, therefrom into the auxiliary mixing chamber 56. In this instance, the venturi section in the auxiliary mixing chamber 56 may be dispensed with. The fuel and air supplied into the mixing chamber 56 are mixed with each other to produce a combustible mixture which is supplied into the combustion chamber 50 for combustion thereof. Suitable control means such as a flow control valve (not shown) may be provided in each of the conduits 62 and 64 to meter the flow of fluid passing therethrough in such a manner that the combustible mixture has a predetermined air-fuel ratio. The combustible mixture may have, for example, an air-fuel ratio near the stoichiometric air-fuel ratio, but it is preferable to avoid same in order to avoid production of large quantities of nitrogen oxides in combustion of the combustible mixture in the combustion chamber 50. The inlet port 58 of the combustion chamber 50 is provided with an inlet valve 66 therein. The inlet valve 66 is normally closed and is operated by a cam (not shown) on a shaft (not shown) driven from the crankshaft 30 so that it is synchronously opened with the intake valve 34. A spark plug 68 is provided in the combustion chamber 50 and, when energized, produces a spark therein to ignite the combustible mixture to produce a flame.

The expander 14 is also provided with a mixing chamber or device 70 for mixing of the free hydrogen containing gas with the main fuel for the engine 12. The mixing chamber 70 communicates with the exhaust port 26 by way of an exhaust conduit 72 for supply of the free hydrogen containing gas thereto. The mixing chamber 70 also communicates with an intake port (not shown) of the engine 12 by way of a conduit 74. A source (not shown) of hydrocarbon fuel for the engine 12 is provided to communicate with the mixing chamber 70 by way of a conduit 76 for supply of the main fuel thereto. The mixing chamber 70 may be formed therein with a venturi section (not shown) through which the free hydrogen containing gas passes and into which the conduit 76 opens. The flow of the free hydrogen containing gas passing through the venturi section during the exhaust stroke of the piston 18 and/or an intake stroke of the engine 12 produces vacuum in the venturi section to draw or induct fuel from the conduit 76 thereinto. A pump may be provided in the conduit 76 to inject fuel under pressure from the source of fuel into the mixing chamber 70. In this instance, the venturi section in the mixing chamber 70 may be dispensed with. The fuel and the free hydrogen containing gas supplied into the mixing chamber 70 are mixed with each other to produce a mixture which is supplied to a combustion chamber or chambers (not shown) of the engine 12. Suitable control means such as a flow control valve (not shown) may be provided in the conduit 76 to meter the flow of fuel passing therethrough in such a manner that the fuel has a predetermined proportion with respect to the free hydrogen containing gas. The amount of the base mixture produced in the main mixing chamber 38 is controlled by the control means mentioned hereinbefore in such a manner that the free hydrogen containing gas has a predetermined proportion to the main fuel which is supplied to the engine.

The operation of the fuel converting system 10 according to the invention thus constructed and arranged is as follows.

The expander 14 is started by suitable means such as a starter motor (not shown). During the intake stroke of the piston 18, the intake valve 34 is opened with the exhaust valve 36 closed so that the base mixture is drawn from the main mixing chamber 38 into the expander chamber 28 through the conduit 40 by the suction movement of the piston 18. Concurrently, the inlet valve 66 is opened so that the combustible mixture is drawn from the auxiliary mixing chamber 56 into the combustion chamber 50 through the conduit 60 by the suction movement of the piston 18. Next, during the compression stroke of the piston 18, the valves 34 and 66 are closed and the base mixture drawn into the expander chamber 28 is compressed by the compression movement of the piston 18 so that the temperature of the base mixture is elevated to a high level. The spark plug 68 is energized to produce a spark in the combustion chamber 50 to ignite the combustible mixture immediately before the top dead center of the compression stroke of the piston 18. As a result, the combustible mixture is quickly burned in the combustion chamber 50 to produce a flame of a high temperature and at a high pressure. The flame is spurted from the combustion chamber 50 into the expander chamber 28 through the conduit 54. The base mixture is agitated and heated to a higher temperature by the flame. As a result, a rapid fuel converting reaction takes place in the base mixture to decompose and convert hydrocarbons of the base mixture into a gas which contains high concentrations of free hydrogen and carbon monoxide. The resultant gas expands to force the piston 18 to cause the expansion stroke of the piston 18. Thus a large portion of heat energy of the free hydrogen containing gas is converted into work energy during expansion of the gas so that the temperature of the gas is reduced, for example, to a level at which the gas has no detrimental effect on the operation of the engine 12 when the gas is supplied thereto. Thus, heat loss is reduced, for example, down to zero. Accordingly, it is unnecessary to provide a radiator or cooler to cool the free hydrogen containing gas. A radiator or cooler may be provided, of course. The work of expansion of the free hydrogen containing gas is accumulated in the flywheel and other working or moving components as power which is employed to cause the subsequent exhaust, intake and compression strokes of the piston 18. As a result, the piston 18 is driven by the inertia of the flywheel and other working members during the exhaust, intake and compression strokes of the piston 18. Thus, the expander 14 does not increase the load demand on the engine 12 or cause power loss of the engine nor does it require provision for driving the piston 18, and is thus self operating or perpetuating except during starting.

During the exhaust stroke of the piston 18, the exhaust valve 36 is opened with the valves 34 and 66 closed so that the free hydrogen containing gas is discharged from the expander chamber 28 into the mixing chamber 70 through the conduit 72 by the exhaust movement of the piston 18 where it is mixed with fuel.

Referring to FIG. 2, there is shown a second preferred embodiment of a fuel converting or cracking apparatus according to the invention. The fuel converting apparatus generally designated by the reference numeral 80 is different from the fuel converting apparatus 10 described above with reference to and illustrated in FIG. 1 in that the auxiliary mixing chamber 56 is supplied with oxygen resulting from the decomposition of hydrogen peroxide ($H_2O_2$) in lieu of air. In FIG. 2, like component elements are designated by the same reference numerals as those used in FIG. 1. The fuel converting apparatus 80 is provided with a source of hydrogen peroxide such as a hydrogen peroxide containing tank 82. The hydrogen peroxide source 82 communicates by way of a conduit 86 with a decomposition chamber 84 which contains therein a suitable catalyst for facilitating decomposition of the hydrogen peroxide. In the decomposition chamber 84, the hydrogen peroxide from the hydrogen peroxide source 82 is converted into oxygen and steam of high temperature. A pump 88 is disposed in the conduit 86 at a location between the hydrogen peroxide source 82 and the decomposition chamber 84 to supply hydrogen peroxide under pressure from the hydrogen peroxide source 82 to the decomposition chamber 84. A flow control valve 90 is disposed in the conduit 86 at a location between the pump 88 and the decomposition chamber 84. The flow control valve 90 is manually or automatically operable to control the flow of hydrogen peroxide supplied to the decomposition chamber 84 in such a manner that the hydrogen peroxide has a predetermined ratio with respect to the fuel supplied to the auxiliary mixing chamber 56 from a source (not shown) of fuel. The decomposition chamber 84 communicates by way of a conduit 92 with a separator 94 which separates the products of decomposition of hydrogen peroxide into oxygen and water. The separator 94 has a first section 96 containing oxygen therein and a second section 98 containing water therein. A radiator or cooler 100 is disposed in the conduit 92 at a location between the decomposition chamber 84 and the separator 94 to cool oxygen and steam supplied from the decomposition chamber 84. The oxygen containing section 96 communicates with the auxiliary mixing chamber 56 by way of a conduit 102. The water containing section 98 is employed as a source of water for the main mixing chamber 38 and communicates with a conduit 46 which communicates with the mixing chamber 38.

Oxygen supplied into the auxiliary mixing chamber 56 is mixed with fuel supplied from the source of fuel to produce a combustible mixture which is supplied to the combustion chamber 50 for combustion therein and for formation of a flame. Since the auxiliary mixing chamber 56 is supplied with oxygen resulting from decomposition of hydrogen peroxide in lieu of air in this manner, the combustible mixture is not diluted by nitrogen forming a part of air. As a result, fuel molecules will rapidly find and react with oxygen molecules to produce rapid and complete combustion in the combustion chamber 50. Accordingly, a flame will be produced which has a higher temperature and is under higher pressure than the flame produced from the combustible mixture formed from fuel and air which is described above with reference to FIG. 1. Consequently, a more complete fuel converting or cracking reaction in the expander chamber 28 is promoted during the expansion stroke of the piston 18 to convert the base mixture into a free hydrogen containing gas. Furthermore, production of nitrogen oxides is reduced to zero.

The embodiment shown in FIG. 2 is appropriate where the hydrogen peroxide in tank 82 contains a relatively low percentage hydrogen peroxide, for example, 30% hydrogen peroxide. When a fuel converting or cracking apparatus according to the invention employs a relatively high percentage hydrogen peroxide which has a high activity in lieu of oxygen or air, the fuel converting apparatus may be constructed to directly inject hydrocarbon fuel, hydrogen peroxide and water into the expander chamber 28 to produce a base mixture therein and to directly inject hydrocarbon fuel and hydrogen peroxide into the combustion chamber 50 to produce a combustible mixture therein. As a result, the base and combustible mixtures are activated to further promote the rate of the fuel conversion reaction in the expander chamber 28.

It will be appreciated that a fuel converting apparatus according to the invention is self-perpetuating to produce a gas with a high concentration of free hydrogen from a hydrocarbon fuel without causing power and heat losses, and accordingly without causing reduction of the total thermal efficiency of an engine by utilizing the exothermic reaction.

It will be appreciated that the present fuel converting apparatus produces a free hydrogen containing gas from a hydrocarbon fuel without adiabatically compressing a base mixture of a hydrocarbon fuel, an oxidant and water, by providing a separate combustion chamber and by producing a flame therein which is supplied into the base mixture to heat the same to the high temperature necessary to accomplish the fuel converting reaction.

Although the invention has been described as being applied to a hydrocarbon fuel, the invention may also be applied to an alcohol fuel such as methanol.

Although the invention has been also described such that the expander is of a four-cycle reciprocating piston type, it can be also of a two-cycle reciprocating piston type or a rotary piston type.

What is claimed is:

1. A method of converting a fuel into a free hydrogen containing gas, comprising the steps of filling a first space with a base mixture of fuel, oxidant and water having a predetermined ratio to each other, compressing said base mixture, filling separately a second space with a combustible mixture of fuel and oxidant having a predetermined ratio to each other, igniting said combustible mixture to produce a flame, spurting said flame into said compressed base mixture, causing conversion of said base mixture into a free hydrogen containing gas and expansion of said free hydrogen containing gas by heat of said flame, making said free hydrogen containing gas perform work during expansion of said gas, accumulating said work performed by said free hydrogen containing gas as power for compressing said base mixture.

2. A method as claimed in claim 1, in which the step of filling said first space with said base mixture is effected by forming said base mixture, and supplying said base mixture into said first space, and the step of filling said second space with said combustible mixture is effected by forming said combustible mixture, and supplying said combustible mixture into said second space.

3. A method as claimed in claim 1, in which the step of igniting said combustible mixture is performed immediately before termination of the step of compressing said base mixture.

4. A method as claimed in claim 1, further comprising the steps of discharging said free hydrogen containing gas to a third space, filling said third space with fuel for an engine and mixing said free hydrogen containing gas with said fuel for said engine.

5. A fuel converting apparatus for converting fuel into a free hydrogen containing gas, comprising a displacement expander having a housing and a working member performing compression and expansion strokes in said housing to define a variable volume expander chamber therein, means for filling said expander chamber with a base mixture of fuel, oxidant and water having a predetermined ratio to each other, said working member compressing said base mixture during said compression stroke thereof, a combustion chamber communicating with said expander chamber, means for filling said combustion chamber with a combustible mixture of fuel and oxidant having a predetermined ratio to each other, means for igniting said combustible mixture in said combustion chamber to produce a flame, means for causing ejection of said flame from said combustion chamber into said expander chamber so that heat of said flame causes conversion of said base mixture into a free hydrogen containing gas and causes expansion of said free hydrogen containing gas to make said working member perform said expansion stroke thereof, means driven by said working member during said expansion stroke of said working member to accumulate power for causing said working member to perform said compression stroke thereof.

6. A fuel converting apparatus as claimed in claim 5, in which said means for filling said expander chamber with said base mixture comprises a main mixing chamber which communicates with fuel supply means, oxidant supply means and water supply means for supply of fuel, oxidant and water, respectively, thereto and for formation of said base mixture therein and which communicates with said expander chamber for supply of said base mixture thereto, and said means for filling said combustion chamber with said combustible mixture comprises an auxiliary mixing chamber which communicates with fuel supply means and oxidant supply means for supply of fuel and oxidant, respectively, thereto and for formation of said combustible mixture therein and which communicates with said combustion chamber for supply of said combustible mixture thereto.

7. A fuel converting apparatus as claimed in claim 6, in which said water supply means comprises a heat exchanger receiving engine exhaust gas thus heating water supplied to said main mixing chamber to produce water vapour.

8. A fuel converting apparatus as claimed in claim 7, in which said water supply means and said oxidant supply means for said auxiliary mixing chamber comprises a source of hydrogen peroxide, a decomposition chamber communicating with said source of hydrogen peroxide to decompose hydrogen peroxide from said source, and a separator communicating with said decomposition chamber to separate the products of decomposition of hydrogen peroxide therefrom into oxygen and water and having an oxygen containing section and a water containing section, in which said water containing section communicates with said main mixing chamber for supply of water thereto, and said oxygen containing section communicates with said auxiliary mixing chamber for supply of oxygen thereto.

9. A fuel converting apparatus as claimed in claim 8, in which said water supply means further comprises a heat exchanger disposed between said main mixing chamber and said water containing section to receive engine exhaust gas and to heat water supplied to said main mixing chamber to produce water vapour.

10. A fuel converting apparatus as claimed in claim 5, in which said combustible mixture is ignited immediately before termination of said compression stroke of said working member.

11. A fuel converting apparatus as claimed in claim 5, further comprising a mixing chamber communicating with said expander chamber, and means for causing discharge of said free hydrogen containing gas to the last-mentioned mixing chamber, the last-mentioned mixing chamber communicating with fuel supply means for supply of fuel thereto and for mixing of fuel with said free hydrogen containing gas and communicating with an engine for supply of a mixture of said free hydrogen containing gas and said fuel thereto.

* * * * *